Sept. 29, 1964　　W. M. BERENBAK ETAL　　3,150,469
TRIMMING OF LARGE BODIES OF RESINOUS CELLULAR MATERIALS
Filed April 30, 1963　　　　　　　　　　　　　　3 Sheets-Sheet 3

INVENTORS:
WILLIAM M. BERENBAK
THOMAS J. FARRELL
HARRY R. KNOX
BY
Richard E. Vila
ATTORNEY

United States Patent Office 3,150,469
Patented Sept. 29, 1964

3,150,469
TRIMMING OF LARGE BODIES OF RESINOUS
CELLULAR MATERIALS
William M. Berenbak, Mendham, Thomas J. Farrell, Morris Plains, and Harry R. Knox, Westfield, N.J., assignors to Allied Chemical Corporation, New York, N.Y., a corporation of New York
Filed Apr. 30, 1963, Ser. No. 276,816
6 Claims. (Cl. 51—80)

This invention relates to trimming of cellular bodies, and more particularly to new and improved apparatus for trimming large bodies of resinous cellular materials such as polyurethane foam.

Cellular products obtained by expansion of resinous materials are of increasing importance. Slabs or boards of a number of foamed materials such as polyurethane have been in constantly increasing demand for use in a variety of applications, including particularly insulating applications in a number of areas of the construction industry. In the production of such slabs or boards it is conventional to produce a large block or bun of the cellular material and then slice or cut the block into a number of individual slabs. The large cellular bodies to be divided into slabs are conventionally produced by expansion of a foamable mixture and have dimensions of typically about 36–40 inches in width and 12–30 inches in height with lengths usually of the order of about 20 feet. Despite their relatively lightweight cell structure the large commercially produced foamed bodies are particularly cumbersome and have characteristic properties which have made the handling and subsequent processing of these bodies far from a simple matter. The cellular bodies produced by open molded expansion are also far from perfectly block-shaped and usually take the form of a bun or loaf. Regardless of the particular method of expansion the large cellular bodies commonly have uneven surfaces caused primarily by uneven expansion or residual expansion after removal from the mold. Such incongruities in the cellular body interfere with the subsequent slabbing operation and must be eliminated if boards of good quality are to be efficiently produced. For example, any incongruities on the bottom of the cellular body will make the body sufficiently unstable to prevent even alignment with the blades of the slabbing apparatus resulting in the uneven cutting of the body and the production of imperfect boards. In order to provide an even surface for the slabbing operation it has been heretofore conventional to cut off the top of the cellular body or bun and then turn the body 180 degrees so that the planed surface becomes the bottom. Such methods naturally involve considerable handling of the large cumbersome cellular bodies requiring additional equipment and labor which add to the cost of the product. Eventually, the remaining side and usually the top surfaces of the cellular body will be trimmed to eliminate surface skin which is characteristic of most foamed materials and to remove the remaining irregularities to assure the production of even-surfaced boards of good marketable quality. This may be done either before or after the slabbing operation and has been also accomplished by such conventional planing methods which interrupt the overall board-producing operation. Moreover, the scrap which is produced in large amounts in such conventional trimming operations is of relatively large size requiring added labor and scrap grinding equipment to convert the scrap to a particulate form in which it is conventionally utilized for by-product purposes.

An object of the present invention is to provide for improved trimming of large bodies of cellular resinous materials.

Another object of the invention is to provide apparatus for efficiently trimming large bodies of cellular material prior to slabbing operations.

Another object is to provide apparatus for trimming large bodies of cellular material in a continuous and uninterrupted operation.

Another object is to provide apparatus capable of trimming bottom, side and top surfaces of a large elongated cellular body in a continuous and uninterrupted operation prior to a slabbing operation.

A further object of the invention is to provide apparatus for continuous complete trimming of large bodies of cellular material to render the surfaces of the cellular body suitable for production of quality boards in a subsequent slabbing operation.

A still further object is to provide apparatus for trimming of large bodies of cellular material with the production of a minimum amount of scrap which is recoverable from the trimming operation in a form suitable for direct use in conventional by-product operations.

Other objects and advantages will be evident from the following description of the invention and accompanying drawings in which:

FIG. 5 is a fragmentary view showing construction of an alternative centering guide system.

Figure 1:
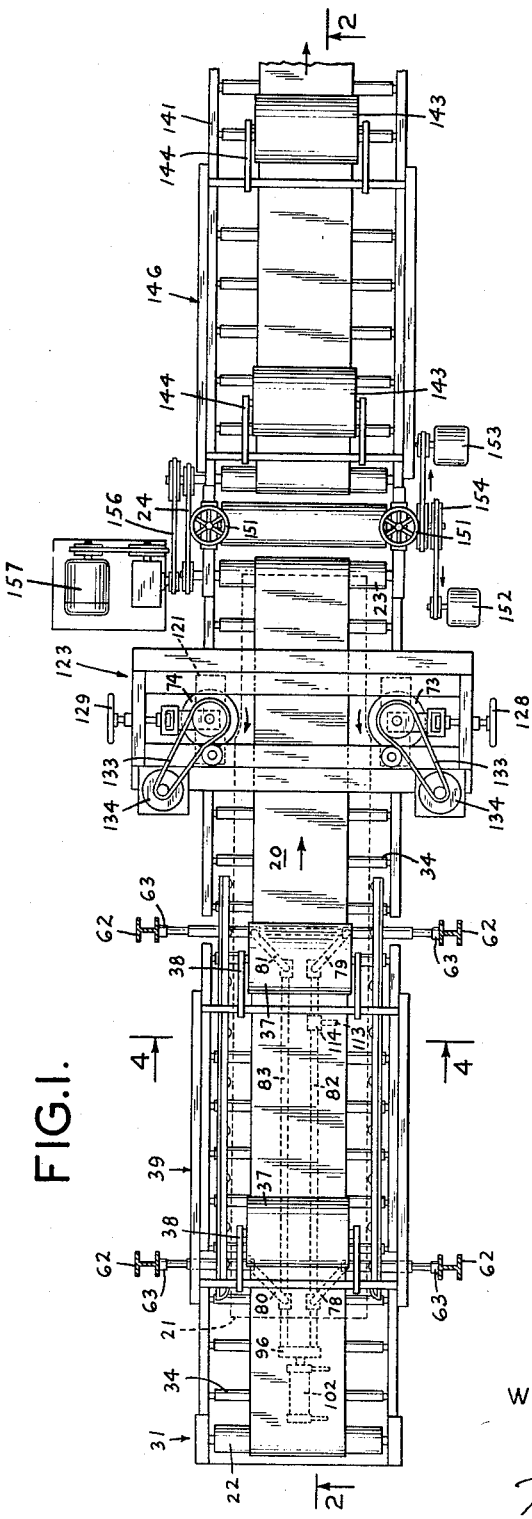
FIG. 1 is a plan view of the trimming apparatus of the invention.
Figure 2:
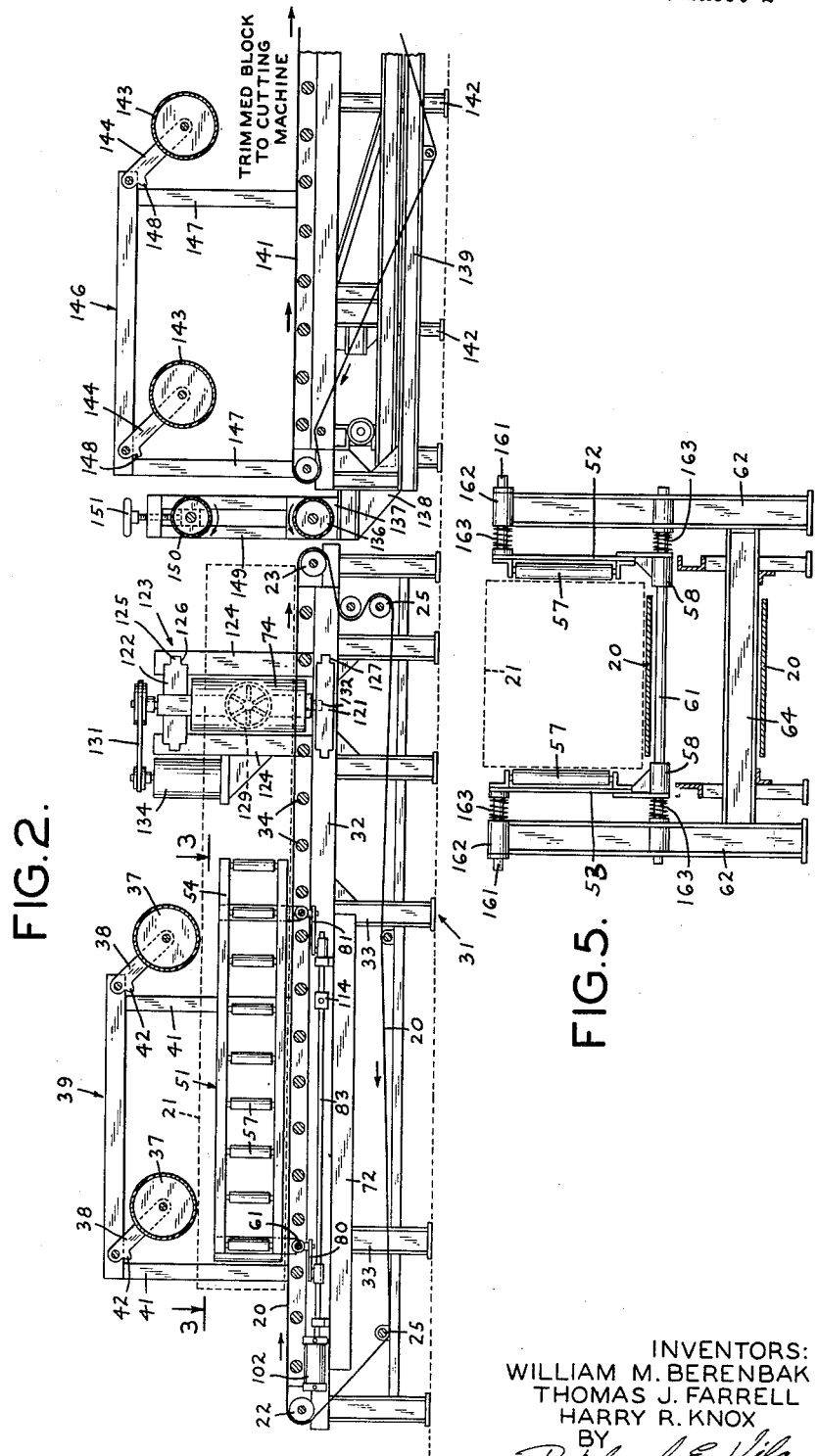
FIG. 2 is a vertical section taken along line 2—2 of FIG. 1.
Figure 4:
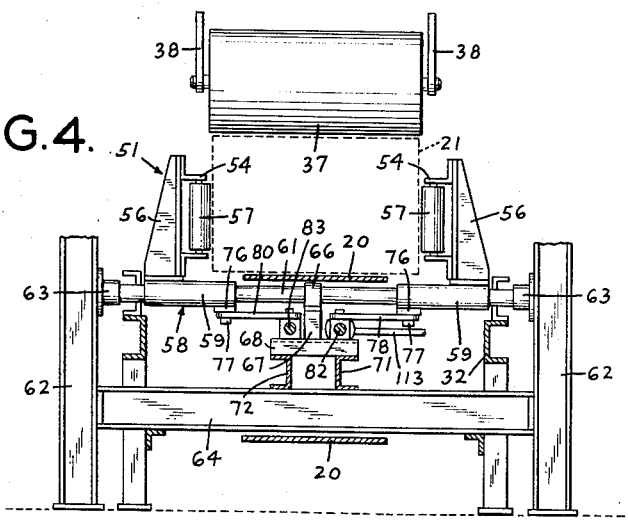
FIG. 4 is a sectional view taken along lines 4—4 of FIGS. 1 and 3.

Referring to the drawings, FIGS. 1, 2 and 4 show the trimming apparatus of the invention to include a conveyor belt 20 which receives a large untrimmed body 21 of cellular resinous material at the upstream end of the apparatus where the conveyor belt turns on roll 22 at the beginning of its run. The cellular body is delivered onto the conveyor belt 20 by an adjacent conveyor (not shown) which is connected to a continuous foaming operation and of sufficient length to permit completion of any residual expansion and required curing of the foamed body. The apparatus of the invention is adapted to handle all required trimming in one continuous operation for transfer to a multiple-blade slabbing machine which divides the trimmed body in finished boards during a single pass through the machine. A particular advantage of the apparatus of the present invention is therefore that it permits production of finished cellular board products in a fully continuous and highly efficient operation from commencement of the initial foaming through the final board cutting operation.

The conveyor belt 20 advances the cellular body along a longitudinal path and is driven between rolls 22 and 23 by a gear train and drive chain assembly 24 connected to roll 23. Conventional idler rolls 25 function to return the conveyor belt well beneath the apparatus. Rolls 22 and 23 are supported on the main stationary frame 31 which includes a longitudinal conveyor frame 32 supported on a plurality of leg frame members 33. The conveyor belt and cellular body are supported during most of the run between the rolls 22 and 23 by a plurality of spaced rollers 34 secured to the longitudinal frame 22. The surface of conveyor belt 20 is of slip-resistant material, preferably corrugated rubber. The cellular body 21 is advanced between the conveyor belt and overhead rollers 37 which are supported on arms 38. Rollers 37 are pivotally mounted through arms 38 on overhead frame 39 which is rigidly secured by vertical frame members 41 to the main stationary frame 31. Rollers 37 exert a moderate pressure on the cellular body 21 to assure movement of the body along a steadily advancing path during the trimming operation. Protrusions 42 on arms 37 are abuttable against the vertical frame members 41 and serve to maintain the rollers 37 at a height sufficient to permit the rollers to automatically mount the advancing cellular body.

Figure 3:
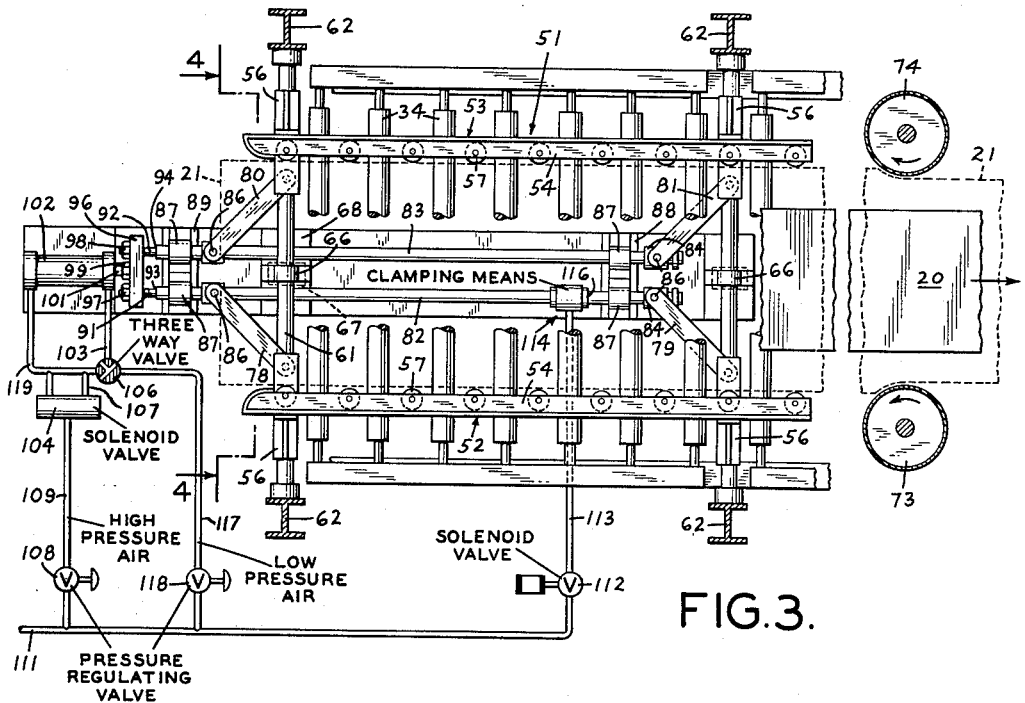
FIG. 3 is a section along line 3—3 of FIG. 2 showing in detail the construction of a centering guide mechanism employed in the apparatus with actuating and control means therefor shown diagrammatically.

The untrimmed cellular body 21 which may have any number of irregularities in the form of wave-like or other similar protrusions is advanced by the conveyor belt 20 between a centering guide assembly 51 (also shown FIG. 3) which includes a pair of cooperating centering guide members 52 and 53 on opposite sides of the conveyor belt or path of movement of the cellular body. Centering guide members 52 and 53 are upright members each preferably including a pair of spaced elongated longitudinally disposed angle members 54 attached to vertically disposed webbed flange members 56. A series of spaced vertically disposed rollers 57 are supported between each pair of angle members 54 on each of the centering guide members. Rollers 57 permit the cellular body in contact therewith to continue in a steadily advancing path on the conveyor. The webbed flange members 56 preferably are secured to each pair of angle members 54 near the opposing longitudinal end portions of the centering guide members 52 and 53. Each of the centering guide members has supporting lateral members 58 which are secured at the bottom of the vertical webbed flange members 56 at the opposite end portions of the guide members. The lateral members 58 are adapted to move the centering guide members transversely with respect to the path of movement of the cellular body and are preferably cylinders 59 having their centerline transverse to the guide members and path of movement of the cellular body. Cylinders 59 may be extruded steel pipe secured by welding to the bottom of the webbed flanges 56. Cylinders 59 are slidably mounted on cross rods 61 which are secured at their end to columns 62 by flanged collars 63. The columns 62, as shown particularly in FIGS. 1 and 3, are spaced outwardly from the main frame 31 and form part of an independent stationary supporting frame system which also includes cross beams 64 spaced well below the cross rods 61 and a similar overhead beam (not shown). The cross rods 61 are supported centrally by bushings 66 which are attached to vertical support members 67 having their lower ends on horizontal plates 68. Each of the horizontal plates 68 are in turn supported between a pair of closely spaced parallel channels 71 and 72 so disposed that one of the channel sides of each channel is secured to the cross beams 64 and of such length that the channels extend well beyond the cross beam 64 nearest the upstream end of the apparatus.

The centering guide members 52 and 53 move laterally inward and cooperate to guide the large untrimmed cellular body 21 advanced therebetween on conveyor 20 towards a pair of corresponding vertically disposed side trimming drums 73 and 74 which are spaced on opposite sides of the conveyor belt 20 with their trimming surfaces slightly in the path of movement of the body. The downstream end of the centering guide assembly 51 is preferably located only a short distance, preferably about 2–5 feet, from the side trimming drums 73 and 74. The centering guide assembly functions to initially center the cellular body and to establish and maintain the body in fixed longitudinal direction toward the side trimming operation so that the vertical disposition of the cellular body is such that the sides are made planar and smooth by removal of all surface irregularities and skin accurately and with a minimum loss of material.

The preferred construction and operation of the centering guide assembly is shown by the drawings with particular reference to FIGS. 3 and 4. The lateral members 58 slidably mounted on cross rods 61 also have a pivot plate 76 welded on the underside thereof. Pivot plates 76 have a pin 77 integral therewith to pivotally secure one end of connecting bars 78, 79, 80 and 81 to the lateral members 58. The connecting bars are operable to move the lateral members and centering guide members 52 and 53 back and forth in a direction transverse the path of movement of the cellular body. It will be noted that each of the cylindrical lateral members 58 is closely slidably fitted over a substantial portion of the cross rods 61 so that one end of a guide member will not move laterally with respect to the other end thus maintaining each of the centering guide members 52 and 53 and rollers 57 at all times in a substantially longitudinal plane. The other ends of connecting bars 78 and 79 are pivotally secured to push-pull rod 82 while connecting bars 80 and 81 are pivotally secured to push-pull rod 83. Each of the connecting bars is pivotally secured to its respective push-pull rods by a pivot block 84 having a pin or bolt 86. The pivot blocks 84 also have a central opening in which the push-pull rod is detachably fixed to the block by a bolt or other suitable fastening means passing through the rod and block. Each of the push-pull rods is slidably supported on collars 87 which are fastened to horizontal plates 88 and 89 which are each supported on the parallel channels 71 and 72. As shown, the push-pull rods 82 and 83 are generally parallel and have respectively corresponding end rod portions 91 and 92 machined or otherwise made of smaller diameter than the main body of the rod forming steps or stops 93 and 94 on the rods 82 and 83, respectively. A cross arm 96 has two openings of sufficient diameter to permit it to be mounted on the end rod portions 91 and 92 for movement with respect thereto between the steps 93 and 94 and adjusting nuts 97 and 98 secured to the threaded ends of rod portions 91 and 92, respectively. Cross arm 96 is secured centrally by a nut 99 or other suitable means to the longitudinally acting piston rod 101 of air piston 102 which is mounted on the parallel closely spaced channels 71 and 72.

*Operation of Push-Pull Rod Assembly for Activation of Centering Guide Members*

In operation generally, the cellular body 21 is advanced between the centering guide members 52 and 53 on conveyor 20 which as shown is of substantially less width than the cellular body to avoid interference with the operation of the centering guide assembly and subsequent side trimming operation. The cellular body to be trimmed is usually of substantial length, typically about 20 feet as shown in phantom in FIG. 1. The first phase of operation of the push-pull rod assembly for operation of the centering guide assembly commences when the leading end of the cellular body reaches approximately the end of the centering guide assembly 51 and usually not later than when the body is about ½ foot from the side trimming operation. In the first operating phase the centering guide members 52 and 53 are moved laterally inward against the sides of the cellular body by introducing high pressure air into one end of the air piston 102 through line 103. The high pressure air is supplied to line 103 by activation of a suitable two-port, two position solenoid valve 104 and proper setting of the three-way switch valve 106 permitting high pressure air to flow through line 107 into line 103 and against the piston 102. The high pressure air is controlled by a pressure regulating valve 108 in the high pressure air supply line 109 which is connected to a main plant supply line 111. On activation of piston 102 the piston rod 101 is retracted moving the cross arm 96 against the adjusting nuts 97 and 98 on the ends of the push-pull rods 82 and 83, respectively. The high pressure air introduced into piston 102 through line 103 is sufficient to cause further retraction of the piston rod and cross arm thereby pulling both push-pull rods an equal distance in the direction of the upstream end of the apparatus as shown on the drawing. Such movement of the push-pull rods simultaneously pulls the ends of connecting bars 78 through 81, inclusive, which are attached to the push-pull rods by pivot blocks 84. The opposite ends of the connecting bars are thereby moved inwardly toward the push-pull rods. The lateral members 58 attached by pivot plates 76 to the connecting bars are caused to slide on cross rods 61 in similar direction inwardly toward the push-pull rods. The centering guide members 52 and 53 are thereby moved an equal distance inwardly toward each other until stopped by abutting against the opposite sides of the cellular body which may be moved by the guide members a short distance in a lateral plane to center the body and establish the direction of its further longitudinal movement. The centering guide members are spaced so that the central plane between the members is aligned with a similar central plane between the side trimming drums 73 and 74 such that the initial centering of the cellular body is with respect to the side trimming operation. The rollers 57 on each of the centering guide members define opposing parallel elongated longitudinal planes which establish the cellular body in a fixed longitudinal direction parallel to such planes and function to maintain the body in such fixed orientation so long as they are in contact therewith. Once the cellular body has been initially centered and the direction of its movement established the first phase of the operating cycle is complete. The second phase of the operating cycle commences by the opening of valve 112 which may be any suitable high pressure air valve such as an air actuated solenoid valve. On opening of valve 112 high pressure air from the plant supply line 111 flows through line 113 and actuates an air operated clamp 114 which closes on a suitable elongated brake drum 116 mounted on the push-pull rod 82. Clamp 114 is supported on the closely spaced channel members 71 and 72 and may be any suitable clamping device adapted to exert and maintain a breaking action against constant force on a cylindrical member, for example, a Model K Air Operated Diaphragm Brake available from the Horton Manufacturing Company (U.S.A.). On activation the clamp 114 operates to secure the push-pull rod 82 in a fixed position so that the centering guide member 52 controlled thereby is also fixed with the rollers 57 thereon defining a lateral fixed longitudinal plane. Simultaneously or soon after the activation of the clamping of push-pull rod 82 the three-way switch valve 106 is again operated to shut off the high pressure air and permit low pressure air from line 117 to flow through line 103 into the air piston 102. The low pressure air is also supplied from the main plant line 111 and is controlled by a pressure regulating valve 118 in line 117. The pressure regulating valve 118 is set at such a level as to permit the piston rod 101 and cross arm 96 to be moved in a downstream direction by forces acting lateral outward on the centering guide member 53 due to irregularities in the cellular body which increase the width of the body by any significant degree above that originally between the centering guide members on activation of clamp 114. In this manner irregularities in the body which may cause jamming of the operation or misdirection of the cellular body are avoided while maintaining the centering guide members 52 and 53 in parallel relation and the movement of the body in its determined longitudinal direction toward the side trimming operation. The amount of low pressure air controlled by regulating valve 118 is at all times also maintained at a sufficiently high level to enable the push-pull rod 83 to move the centering guide member 53 inwardly in constant contact with the cellular body as the irregularities causing outward movement pass from between the guide members and the cellular body therebetween returns to a more normal width.

The final phase of the operating cycle begins when the cellular body has passed through the centering guide assembly 51 a sufficient distance to assure that its direction of movement is complete, usually when the trailing end of the body is about 2–5 feet from the downstream end of the centering guide assembly and well progressed into the side trimming operation, desirably after the cellular body has completely entered a subsequent bottom trimming operation. The three-way switch valve 106 is turned to a closed position and two-port, two-position valve 104 actuated to shunt high pressure air through line 119 into the end of air piston 102 opposite line 103. The high pressure air introduced from line 119 drives the piston rod 101 and cross arm 96 in a downstream direction as shown on the drawings. The cross arm 96 moves over the push-pull rod extensions 91 and 92 against steps 93 and 94 and on continued movement pushes the push-pull rods 82 and 83 which causes the centering guide members 52 and 53 to spread apart preparatory to receiving a following cellular body and the next operating cycle. The lateral limit of travel of the centering guide members on the cross rods 61 is controlled by collars 87 which act as stops in both directions of movement of the push-pull rods. On retraction of cylinder arm 101 the maximum distance of inward travel of the centering guide members is determined by the pivot blocks 84 and the collars 87. Such distance is usually set so that the vertical opposing planes defined by the rollers on the guide members are approximately in alignment with the peripheral edge of the trimming drums closest adjacent the respective sides of the path of movement. Usually only minor variations are desired in the limit of lateral movement of the centering guide members and these may be made by moving the adjusting nuts 97 and 98 along the threaded end portions of the extension rod sections 91 and 92. On extension of the piston rod 101 the cross arm 96 will be stopped by the collars 87 such that the maximum spacing between the guide members is determined by the positioning of the stepped portions 93 and 94 of the push-pull rods with respect to the collars 87.

The centering guide assembly 51 directs the cellular body 21 toward the opposing side trimming drums 73 and 74 in such a manner that the trimming surfaces of the drums are respectively slightly in the path of movement of the cellular body. The spacing between the trimming drums 73 and 74 is determined generally according to the nominal width of the mold in which the cellular body was produced and is generally set to be somewhat less than the width of the mold in order to assure removal of surface skin from any repressed or contracted portions of the cellular body. Each of the drums 73 and 74 are individually driven and laterally adjustable to permit change in the spacing between the drums as shown particularly in FIGS. 1 and 2, each of the trimming drums 73 and 74 are vertically mounted between lower journal plates 121 and upper bearing plates 122, both drums are supported on a frame assembly designated generally as 123 and including vertical frame members 124, cross frame members 125, and the upper and lower spaced rail members 126 and 127, respectively. The lower journal plates 121 are supported on the lower rails 127 while the upper bearing plates 122 are supported on the upper rails 126. Suitable conventional adjusting wheel assemblies 128 and 129 are held on intermediate cross members (not shown) and are connected to the journal and bearing plates supporting each drum 73 and 74, respectively, to permit lateral adjustment of the trimming drums along the rails 126 and 127. The journal plates 121 have suitable thrust bearings secured to one end of the drum shafts 132 while suitable shaft bearings support the shafts 132 on the bearing plates 122 at the upper end of the drum. Each of the trimming drums rotates in a direction contra the direction of the cellular body and is driven by the belt and pulley assembly 133 attached at one end of the drum shafts 132 and driven by a suitable motor 134 attached to the frame assembly 123. The surfaces of the drums 73 and 74 have a coarse hard particulate material thereon specifically adapted to remove the cellular resinous material and form smooth surfaces on the cellular body. The coarse particulate material desirably has particle size between about 30 to 50 standard grit particularly between about 34 to 46 standard grit. The preferred material giving highly efficient trimming is silicon carbide (Grit No. 36) which may be applied to the drum surfaces in a form in a suitable tape having a waterproof backing and spirally wound to cover the entire surface of the drum.

After the side trimming operation the cellular body is directed toward a horizontal trimming operation which is adapted to remove material from the bottom and, if desired, from the top of the cellular body. The side trimming operation is desirably located, as shown, after the side trimming operation to assure that the bottom surface of the cellular body is made perfectly planar which is important for the subsequent slabbing operation. Location soon after the side trimming operation is particularly desirable as the vertical disposition of the cellular body on the conveyor belt 20 is made particularly stable by the vertically disposed trimming surfaces of side trimming drums 73 and 74 which assures that a planar surface generally perpendicular to the trimmed sides will be made by the horizontal trimming operation. As shown, the bottom trimming is accomplished by a horizontally disposed trimming drum 136 which is journaled on the sides of a supporting frame 137 which is in turn supported on a frame extension seat 138 secured to the upstream end of a separate main conveyor support frame 139. The horizontal bottom trimming drum 136 has its upper surface disposed above the level of conveyor belt 20 by a predetermined distance set according to the amount of material to be removed from the bottom of the body. Immediately down-stream of the bottom trimming drum 136 the bottom trimmed cellular body is picked up on a second conveyor belt 141 which has its conveyor surface at the same horizontal level as the top of the trimming drum 136 to assure that the bottom of the cellular body is made perfectly planar. The amount of material removed from the body can be varied as desired by raising or lowering the horizontal drum 136 and conveyor 141 as a unit by moving of the conveyor frame assembly 139 on a second main frame and jack assembly 142. Overhead rollers 143 are similar to rollers 37 and are pivotally mounted by arms 144 on an overhead frame assembly 146 which is secured by vertical frame members 147 to the conveyor frame 139. Protrusions 148 function the same as protrusions 42. The rollers 143 exert a moderate pressure on the cellular body to assure movement steadily along the conveyor 141 and in a general fixed path for transfer subsequent slabbing operation.

The horizontal bottom trimming drum 136 rotates contra the direction of movement of the advancing cellular body and has its surface coated with a coarse hard particulate material similar to the vertical side trimming drums 73 and 74. Top trimming of the cellular body is usually desirable and may be readily effected by an upper horizontal trimming drum 150 which is supported on a vertical extension frame 149 of the frame 137. The top trimming drum 150 also rotates contra the direction of the advancement of the cellular body and is adjustable vertically by a pair of conventional adjusting wheel assemblies 151 secured at the top of the vertical extension frame 149. Each of the horizontal trimming drums 136 and 150 are driven separately by suitable motors 152 and 153, respectively, which are attached to the respective shafts of the drums by drive belt and pulley assemblies 154. The material removed from the cellular body and collected is in fine granular or powdered form and particularly suitable for molding or similar conventional by-product utilization operations. The conveyor belt 141 is driven by a suitable gear train and drive chain assembly 156 attached to a suitable motor 157 which also drive the conveyor 20 through gear train and drive chain assembly 24.

Alternative construction and operation of the centering guide is shown with reference to FIG. 5. The opposing pair of centering guide members 52 and 53 are slidably mounted on cross rods 61 by lateral member 58 secured to the guide members. Parallel spaced rollers 57 on the centering guide members 52 and 53 define opposing parallel elongated longitudinal planes to center and guide the direction of the cellular body. Transversely acting rods 161 are secured to upper portions of each centering guide member vertically above the cross rods 61 which are fixedly secured to columns 62. The transversely acting rods 161 are slidably mounted within similar bearing supports 162 secured to the vertical support columns 62. Springs 163 are mounted on rods 161 between the bearing supports 162 and upper portion of the centering guide members. Similar springs are also mounted on cross rods 61 between the lower portion of the centering guide members and column 62. The springs 163 act transversely against the centering guide members 52 and 53 to move the guide member laterally inward against the cellular body to center the body with respect to the side trimming operation and establish and maintain the longitudinal direction of the cellular body.

Although certain preferred embodiments of the invention have been disclosed for purpose of illustration, it will be evident that various changes and modifications may be made therein without departing from the scope and spirit of the invention.

We claim:

1. Apparatus for trimming a large elongated body of cellular resinous material comprising, in combination, means for advancing a large elongated body of cellular resinous material along a path, centering guide means associated with said path of movement and including a pair of centering guide members each on opposing sides of the path of movement and having their opposing sides defining opposing substantially parallel elongated longitudinal planes adjacent to the path of movement, at least one of said centering guide members being mounted to permit movement transversely to the path of movement with the elongated plane defined by its side maintained in substantially parallel relationship to the opposing plane of the other member of said pair, means for moving said centering guide members cooperately toward each other and against opposite sides of the cellular body advanced therebetween to establish and maintain said body in a longitudinal direction essentially parallel to the planes defined by said opposing sides of the centering guide members, side trimming means spaced on each side of the path of movement downstream from the centering guide means and having trimming surfaces operable in a direction generally contra to the movement of said cellular body and slightly in the path of movement of said body, and bottom trimming means downstream from said side trimming means and having a transversely disposed trimming surface operable in a direction contra the movement of the cellular body and slightly in the path of movement of the lower portion of said body to form a planar supporting surface on the bottom of the cellular body.

2. Apparatus for trimming a large elongated body of cellular resinous material comprising, in combination, means for advancing a large elongated body of cellular resinous material along a path, centering guide means associated with said path of movement and including a pair of centering guide members each on opposing sides of the path of movement and having their opposing sides defining opposing substantially parallel elongated longitudinal planes adjacent to the path of movement, said centering guide members being mounted to permit movement transversely to the path of movement with the elongated planes defined by their opposing sides maintained in substantially parallel relationship, means for moving said centering guide members cooperately toward each other and against opposite sides of the cellular body advanced therebetween to establish and maintain said body in a longitudinal direction essentially parallel to the planes defined by said opposing sides of the centering guide members, side trimming means spaced on each side of the path of movement downstream from the centering guide means and having trimming surfaces operable in a direction generally contra to the movement of said cellular body and slightly in the path of movement of said body, and bottom trimming means downstream from said side trimming means and having a transversely disposed trimming surface operable in a direction contra to the movement of the cellular body and slightly in the path of movement of the lower portion of said body to form a planar supporting surface on the bottom of the cellular body.

3. The apparatus of claim 2 in which the elongated longitudinal planes defined by the opposing sides of the centering guide members are formed by a plurality of spaced vertically disposed rollers secured to each such centering guide members.

4. The apparatus of claim 2 in which the side trimming means includes a pair of vertically disposed rotatable cylinders located on opposing sides of the path of movement of the cellular body a short distance downstream from the end of said centering guide means.

5. Apparatus of claim 2 in which there is included means for securing one of said centering guide members after said pair of guide members has been moved cooperatively against the cellular body for initial centering of said body and means adapted to apply force sufficient to permit the other centering guide member to move both transversely outward and inward while maintained in contact with the cellular body.

6. The apparatus of claim 2 in which there is included pneumatically operated means adapted to apply to both said centering guide members an equal uniform force sufficient to permit said centering guide members to move both transversely and cooperately outward and inward while maintained in contact with the cellular body, after initial centering of said cellular body by said centering guide members.

References Cited in the file of this patent
UNITED STATES PATENTS

| | | |
|---|---|---|
| 1,727,863 | Clifford | Sept. 10, 1929 |
| 2,901,868 | Price et al. | Sept. 1, 1959 |